United States Patent [19]

Harris et al.

[11] Patent Number: 4,709,306

[45] Date of Patent: Nov. 24, 1987

[54] REMOTE ADJUSTING MEANS FOR A VEHICLE HEADLAMP

[75] Inventors: Gerald A. Harris, Fraser; Thomas W. Schumacher, Pontiac, both of Mich.

[73] Assignee: Chrysler Motors, Highland Park, Ill.

[21] Appl. No.: 812,545

[22] Filed: Dec. 23, 1985

[51] Int. Cl.[4] .............................................. F21V 3/18
[52] U.S. Cl. ..................................... 362/68; 362/287; 362/419; 362/66
[58] Field of Search ..................... 362/66, 61, 67, 68, 362/80, 285, 287, 289, 319, 322, 324, 418, 421, 424, 427, 428

[56] References Cited

U.S. PATENT DOCUMENTS

| | | | |
|---|---|---|---|
| 1,591,754 | 7/1926 | Gates | 362/284 |
| 2,933,019 | 4/1960 | Milton et al. | 88/93 |
| 3,000,263 | 9/1961 | Milton et al. | 362/68 |
| 3,352,524 | 11/1967 | Rossi | 248/278 |
| 3,932,837 | 1/1976 | Baker | 362/419 |
| 4,074,463 | 2/1978 | Colanzi | 49/352 |
| 4,077,268 | 3/1978 | Hill | 74/89 |
| 4,186,427 | 1/1980 | Ishikawa et al. | 362/287 |
| 4,188,655 | 2/1980 | Tallon et al. | 362/80 |
| 4,249,771 | 2/1981 | Gergoe et al. | 296/146 |
| 4,293,897 | 10/1981 | Deverrewaere | 362/284 |
| 4,309,740 | 1/1982 | Takata | 362/66 |
| 4,336,572 | 6/1982 | Takata | 362/66 |
| 4,366,725 | 1/1983 | Kondo | 74/501 R |
| 4,471,413 | 9/1984 | Dick | 362/80 |
| 4,524,407 | 6/1985 | Igura | 362/66 |

FOREIGN PATENT DOCUMENTS

| | | | |
|---|---|---|---|
| 589838 | 6/1925 | France | 362/66 |
| 1032671 | 4/1953 | France | 362/418 |

Primary Examiner—Charles J. Myhre
Assistant Examiner—D. M. Cox
Attorney, Agent, or Firm—Edward A. Craig

[57] ABSTRACT

Remote adjusting means are provided for a vehicle headlamp. The vehicle headlamp has at least three peripherally spaced mounting means each securable to vehicle structure. One of the mounting means includes a ball and socket pivot structure permitting the vehicle headlamp to be adjusted for vertical and horizontal focusing. Cable actuated screws are provided for the other two mounting means to permit remote adjusting of the headlamp.

2 Claims, 6 Drawing Figures

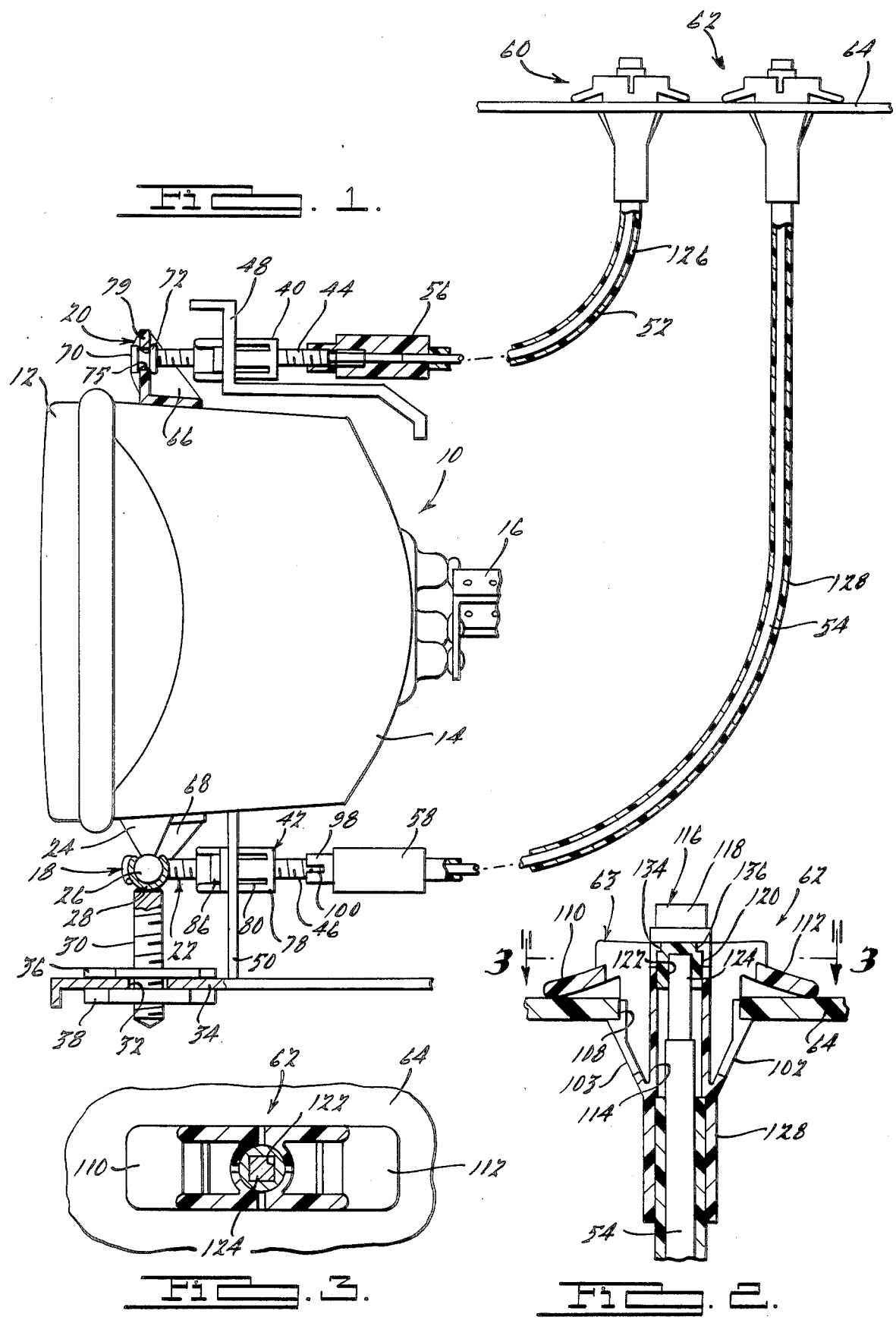

REMOTE ADJUSTING MEANS FOR A VEHICLE HEADLAMP

BACKGROUND OF THE INVENTION

1. Field of the Invention

This invention relates to remote adjusting means for a vehicle headlamp and more particularly to screw actuating cable structure connected at one end to a vehicle headlamp adjusting screw and terminating in driving means at the other end at a location remote from the vehicle headlamp.

2. Prior Art

It is necessary that vehicle headlamps be adjustable. The headlamp beam should be adjusted to provide the driver with maximum road visibility.

Traditionally, vehicle headlamps have had a three-point mounting system. The headlamp is pivotally connected to the vehicle at one point permitting the vehicle headlamp to be adjusted for vertical and horizontal focusing. The other two mounting points have had adjusting means thereon for focusing the headlamp horizontally and vertically. The adjusting structure has, in the past, been manually adjusted by a service technician who is able to manipulate the adjusting structure directly at the location of the headlamps.

Modern vehicle headlamps structure has made it increasingly difficult to provide access for the service technician directly at the location of the headlamps. This problem is solved in accordance with the present invention by providing cable extensions from the headlamps which terminate in a remote location accessible to a technician for adjusting the headlamps without having to adjust structure located directly in the area of the headlamps. This permits the headlamps to be conveniently adjusted without inhibiting the design and construction of the headlamps.

SUMMARY OF THE INVENTION

Remote adjusting means are provided for a vehicle headlamp. The headlamp is of the type having at least three peripherally spaced mounting means each securable to vehicle structure. One of the mounting means includes pivot structure permitting the vehicle headlamps to be adjusted for vertical and horizontal focusing. The other two mounting means each include nut and screw structure for adjustment of the vehicle headlamp. A flexible cable is connected at one end to each nut and screw structure. The cables extend from the nut and screw structures and terminate at the other end at a location remote from the vehicle headlamp. Each cable has driving means at the termination thereof permitting rotation of the cable at the remote location to actuate the nut and screw means for adjustment of the vehicle headlamp.

Each of the other two mounting means comprises a nut fixedly and non-rotatably secured to vehicle structure. A screw threadingly engages the nut. Bracket structure is provided on the vehicle headlamp. The screw is fixedly and freely rotatably connected to the bracket structure. A cable is connected to the screw for threading thereof into and out of the nut for adjustment of the vehicle headlamp. A connector connects the cable to the screw. The connector comprises an elongated element having a reentrant opening at each end. Each reentrant opening defines a wrench engageable socket. The ends of the screw and cable each have wrench engageable heads. Each of the heads is non-rotatably received in one of the sockets whereby turning of the cable will result in turning of the screw. A tubular portion of smaller diameter than the threaded portion of the screw extends axially outwardly from the reentrant opening which receives the head of the screw. The tubular portion has axially extending slits therein. A threaded portion of the screw is force-fitted into the tubular portion with the slits of the tubular portion permitting sufficient deflection to receive and thereafter grasp the threaded portion to retain the threaded portion in place. The head of the cable is bonded to the connector to retain the head in place.

The driving means comprises a snap-fit connector securable to vehicle structure. The snap-fit connector has an opening therethrough. A driver element is fixedly and freely rotatably received in one end of said opening. The driver element has a tool engageable head positioned outside of the opening. The cable is received in the other end of the opening and is fixedly and non-rotatably secured in place.

BRIEF DESCRIPTION OF THE DRAWINGS

FIG. 1 is a side elevational view of a headlamp with the remote adjusting means of the present invention secured thereto;

FIG. 2 is a side elevational view on an enlarged scale of the driving means for the cable as shown in FIG. 1 with portions broken away for the purpose of clarity;

FIG. 3 is a sectional view taken substantially along the line 3—3 of FIG. 2 looking in the direction of the arrows;

DESCRIPTION OF THE PREFERRED EMBODIMENT

Figure 4:
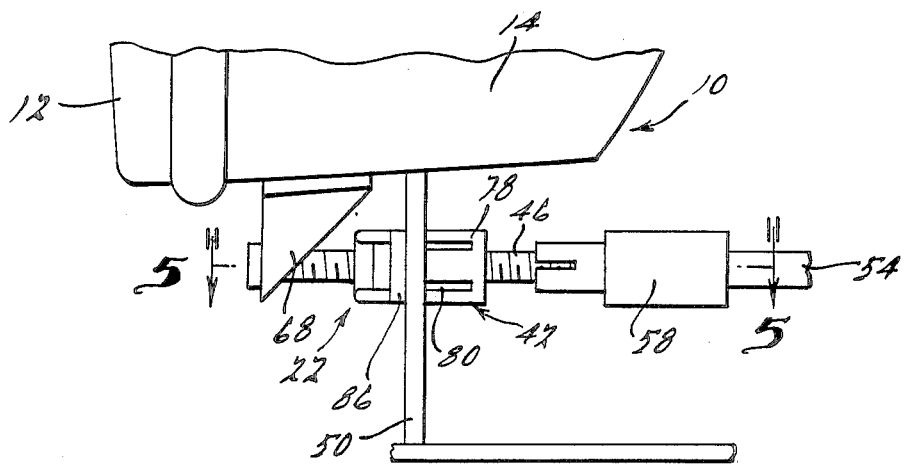
FIG. 4 is a view of the lower bracket connection of the cable to the headlamp on an enlarged scale with respect to FIG. 1.

Referring to FIG. 1, it will be noted that the vehicle headlamp 10 comprises a lens 12 which is mounted on a casing structure 14. Bulb and reflector structures are provided within casing 14. Electrical terminal structure 16 is provided for energizing the headlamp.

The headlamp 10 is attached by a three-point suspension mounting to structure of the vehicle. As will become apparent hereafter, the attitude may be separately and independently adjusted for vertical and horizontal focus. One suitable mounting system is illustrated in U.S. Pat. No. 4,188,655, Tallon et al, issued Feb. 12, 1980. In this system, mounting means are provided to effect headlamp adjustment about a coplanar pair of mutually perpendicular and intersecting axes, one of which passes through the geometric center of the headlamp. However, this specific structure is not necessary to effectuate the present invention, the present invention being useful in constructions wherein the mounting means do not effect adjustment of the headlamp about a coplanar pair of mutually perpendicular and intersecting axes. It is only necessary that a pair of mounting or suspension points be provided for the lamp so that vertical and horizontal focusing of the headlamp is possible.

Other conventional mounting means as are currently employed in the automotive industry may be used.

The headlamp 10 has at least three peripherally spaced mounting means 18, 20, 22 each of which is secured to vehicle structure. One of the mounting means 18 includes pivot structure permitting the vehicle headlamp to be adjusted for vertical and horizontal focusing. As will be noted, the mounting means 18 includes a bracket 24 which is secured to the underside of the casing structure 14. The bracket 24 carries a ball 26 on the lower end thereof. The ball 26 is received in a socket 28. This ball and socket relationship permits the usual pivoting in vertical and horizontal planes. The socket 28 has secured to the underside thereof a threaded element 30 which passes through an opening 32 in vehicle structure 34. Nuts 36, 38 are provided on the threaded element 30 above and below the vehicle structure 34. This arrangement permits initial vertical adjustment of the vehicle headlamp 10 while securing the headlamp 10 in fixed relationship to the vehicle structure.

Figure 6:
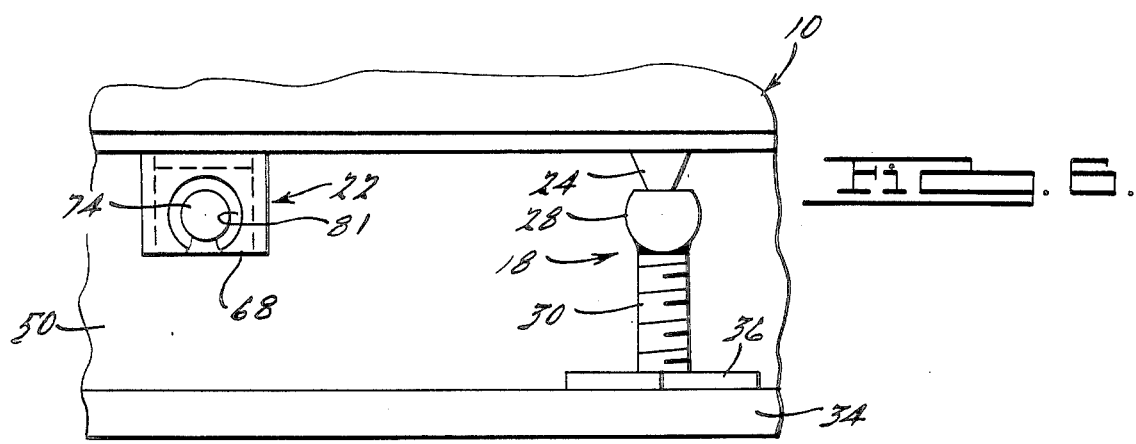
FIG. 6 is a front view with respect to FIG. 1 illustrating the cable connection and pivot connection for the headlamp.

The other two mounting means 20, 22 each include a nut 40, 42 and screw 44, 46 structure for adjustment of the vehicle headlamp 10 to control vertical and horizontal focusing. The nut 40 is secured to vehicle structure 48 while the nut 42 is secured to vehicle structure 50. A flexible cable 52, 54 is connected at one end at a screw 44, 46. A connector 56, 58 is provided for this purpose. The cables 52, 54 extend from the nut and screw structures and terminate at the other end at a location remote from the vehicle headlamp. This location may be any desired position in, for example, the engine compartment or under the dash board of a vehicle. Each cable has a driving means 60, 62 at the termination thereof. The driving means permit rotation of the cable at the remote location to actuate the nut and, screw means for adjustment of the vehicle headlamp. The driving means 60, 62 are secured to vehicle structure 64. As will be seen in FIG. 6, the cable 54, which controls adjustment of the headlamp in the horizontal plane, is connected to mounting means 22 a distance to one side of the ball and socket mounting means 18. The cable 52 is connected to mounting means 20 which is positioned at approximately the center of the headlamp 10 to control adjustment of the headlamp in the vertical plane. However, as previously mentioned, it is not necessary to have this connection at the exact center of the headlamp.

Figure 5:
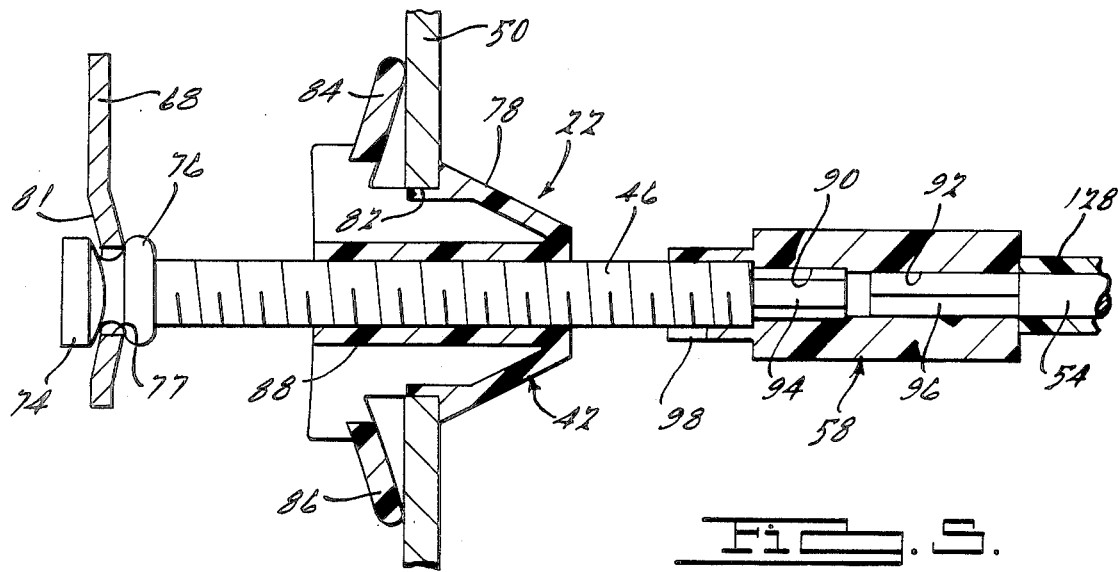
FIG. 5 is a sectional view on an enlarged scale taken substantially along the line 5—5 of FIG. 4 looking in the direction of the arrows.

Each of the screws 44, 46 is connected to a bracket 66, 68, the brackets being connected to the casing 14, preferably molded integrally therewith. As will be noted in FIGS. 1 and 5, each screw has enlarged spaced apart head portions 70, 72, 74, 76 positioned on opposite sides of bracket openings 75, 77 which retain the screws to the brackets in a fixed relationship while permitting free rotation of the screws with respect to the brackets. As shown in FIG. 1, a slot 79 is provided for insertion of the screws into the bracket openings. As will be appreciated, threading of the screws in one direction will effect adjustment in that direction inasmuch as the headlamp is also pulled in that direction while threading of the screws in the other direction will have the opposite effect, thereby permitting adjustment of the headlamp as desired. As shown in FIG. 5, the head portions are curved, the openings are of larger diameter than the screws and bracket portions near the openings are dished as shown at 81 to permit rolling of the screws. This permits limited give of one screw connection when the other screw is threaded in or out without, however, significantly altering the focus of the headlamp.

The nuts 40, 42 are the same and therefore only the nut 42 will be described. The nut 42 is best illustrated in FIGS. 1 and 5. As will be therein noted, the nut 42, which is preferably fabricated of plastic, includes a flared portion 78 having slits 80 in the walls thereof. The slits 80 permit inward deflection of the side walls of the flared portion 78 thus permitting a snap-in fit through the opening 82 provided in vehicle structure 50. Angularly directed foot portions 84, 86 are provided on the nut 42 and press against the vehicle structure 50 after conical portion 78 has been forced through opening 82 thus holding the nut firmly in place. The nut, being generally rectangular, is nonrotatable with respect to the vehicle structure.

The nut 42 has a central tubular portion 88 which is internally threaded to threadingly receive the screw 46.

The screws are secured to the cables by means of the connectors 56, 58 as previously mentioned. Again, in view of the fact that both connectors are the same, only the connector 58 will be described. As will be noted in FIG. 5, the connector 58 comprises an elongated element and has a reentrant opening 90, 92 at each end. Each reentrant opening has internal flats to define a wrench engageable socket of the type used with Allen wrenches. The ends 94, 96 of the screw 46 and cable 54 have similar flats whereby when the heads are inserted into the sockets, turning forces from the cable will be applied to the screw to thereby turn the screw. A tubular portion 98 of smaller diameter than the threaded portion of the screw 46 extends axially outwardly from the reentrant opening 90. The tubular portion 98 has an axially extending slit 100 therein. The threaded portion of the screw 46 immediately adjacent the head 94 is force fitted into the tubular portion with the slit 100 permitting sufficient deflection to receive and thereafter grasp the threaded portion to retain the threaded portion and thereby the screw 46 in place. The head 96 of the cable is bonded, by means of a suitable adhesive, within the reentrant opening 92 to retain the head 96 and thereby the cable in place.

As previously mentioned, the cables 52, 54 are connected to vehicle structure 64 by means of the driving means 60, 62. Again, since both driving means are the same, only the structure of the driving means 62 will be described. This is best seen in FIGS. 1, 2 and 3. The driving means 62 includes a connector 63 which has an outwardly flared generally rectangular lower portion 102 which has slits 103 to permit the wall portions to flex inwardly and permit a snap-in fit through opening 108. Flexible feet 110, 112 press on the opposite side of the vehicle structure 64 after snap-fitting of the connector 63 to thereby retain the connector in place. An opening 114 is provided through the connector. A driver element 116 is provided on the top of the connector. The driver element has a tool engageable head 118 externally of the connector. The head 118 may have, for example, a star shaped indentation for engagement by means of a suitable screw drive blade, alternately, the head 118 may be made in a wrench engageable form. The driver element 116 has a portion 120 located within opening 114. The portion 120 has a socket 122 with internal flats to make the socket wrench engageable as previously described in connected with the connector 58. The end 124 of the cable 54 has mating flats thereon to define a wrench engageable head which is received within the socket 122 to form a non-rotatable connection therewith. Turning of the driver element 116 will result in turning of the cable 54. The end 124 of the cable is preferably bonded or swaged in place. The flexible cables 52, 54 may be any of those currently available on the market, such as wire rope or solid wire. A plastic tubular sheath 126, 128 covers each of the cables. The driver element 116 is undercut at 134 to receive collar portion 136 of the connector 63 to thereby retain the driver element 116 fixedly in place while permitting free rotation thereof.

Having thus described our invention, we claim:

1. Remote adjusting means for a vehicle headlamp, the headlamp having at least three peripheral mounting means each securable to vehicle structure, one of the mounting means including pivot structure permitting the vehicle headlamp to be adjusted for vertical and horizontal focusing, the other mounting means each including nut and screw structure for said adjustment of the vehicle headlamp, a flexible cable connected at one end to each nut and screw structure, each of said other two mounting means comprising a nut fixedly and non-rotatably securable to vehicle structure, a screw threadably engaging the nut, bracket structure on the vehicle headlamp, the screw being fixedly and freely rotatably connected to the bracket structure, one of the cables being connected to the screw for threading thereof into and out of the nut for said adjustment of the vehicle headlamp, a connector connecting each cable to each screw, each connector comprising an elongated element having a reentrant opening at each end, each reentrant opening defining a wrench engageable socket, the ends of the screw and cable having wrench engageable heads thereon, each of the heads being non-rotatably received in one of the sockets whereby turning of the cable will result in turning of the screw, a tubular portion of smaller diameter than the threaded portion of the screw extending axially outwardly from the reentrant opening which receives the head of the screw, said tubular portion having axially extending slits therein, a threaded portion of the screw being forced fitted into the tubular portion with the slits of the tubular portion permitting sufficient deflection to receive and thereafter grasp the threaded portion retain the threaded portion in place, said cables extending from the nut and screw structures and terminating at the other end at a location remote from the vehicle headlamp, each cable having driving means at the termination thereof permitting rotation of the cable at the remote location to actuate the nut and screw means for said adjustment of the vehicle headlamp.

2. Remote adjusting means for a vehicle headlamp as defined in claim 1, further characterized in that the head of the cable is bonded to the connector retain the head in place.

* * * * *